(12) United States Patent
Ju

(10) Patent No.: US 10,243,884 B2
(45) Date of Patent: Mar. 26, 2019

(54) PACKET TRANSMISSION METHOD AND APPARATUS

(71) Applicant: Huawei Technologies Co., Ltd., Shenzhen (CN)

(72) Inventor: Wenbin Ju, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 14/962,916

(22) Filed: Dec. 8, 2015

(65) Prior Publication Data

US 2016/0164805 A1    Jun. 9, 2016

(30) Foreign Application Priority Data

Dec. 9, 2014  (CN) .......................... 2014 1 0751060

(51) Int. Cl.
| H04L 12/46 | (2006.01) |
| H04L 12/937 | (2013.01) |
| H04L 12/705 | (2013.01) |
| H04L 12/707 | (2013.01) |
| H04L 12/709 | (2013.01) |

(52) U.S. Cl.
CPC ............ H04L 49/253 (2013.01); H04L 45/18 (2013.01); *H04L 45/24* (2013.01); *H04L 45/245* (2013.01)

(58) Field of Classification Search
None
See application file for complete search history.

(56) References Cited

U.S. PATENT DOCUMENTS 8,705,526 B1    4/2014 Hasan
9,178,717 B1 *  11/2015 Ruble ................. H04L 12/6418
(Continued)

FOREIGN PATENT DOCUMENTS

| CN | 102326370 A | 1/2012 |
| CN | 103354529 A | 10/2013 |

(Continued)

OTHER PUBLICATIONS

Hanson et al., "Virtual Machine Fabric Extension (VM-FEX); Bringing the Virtual Machines Directly on the Network," BRKCOM-2005, PowerPoint, Cisco, San Jose, California (2013).

*Primary Examiner* — Gregory B Sefcheck
*Assistant Examiner* — Jenkey Van
(74) *Attorney, Agent, or Firm* — Leydig, Voit & Mayer, Ltd.

(57) ABSTRACT

The present disclosure provides a packet transmission method and an apparatus. A first network device receives, through an inter-system cascade port, a first packet sent by a second network device, and adds a first remote RMT identifier to the first packet to obtain a second packet; d the first network device determines, according to the first RMT identifier in the second packet and an attribute of a sending port for the second packet, whether there is a need to perform pruning processing on the second packet; and if the sending port for the second packet is a multi-homed port, the first network device performs pruning processing on the second packet; if the sending port for the second packet is a single-homed port, the first network device deletes the first RMT identifier in the second packet, and sends the first packet through the single-homed port.

16 Claims, 8 Drawing Sheets

---

A first network device receives, through an inter-system cascade port, a first packet sent by a second network device, and adds a first remote RMT identifier to the first packet to obtain a second packet  ~S201

The first network device determines, according to the first RMT identifier in the second packet and an attribute of a sending port for the second packet, whether there is a need to perform pruning processing on the second packet; and if the sending port for the second packet is a multi-homed port, the first network device performs pruning processing on the second packet; or if the sending port for the second packet is a single-homed port, the first network device deletes the first RMT identifier in the second packet, and sends, after obtaining the first packet, the first packet through the single-homed port  ~S202

(56) References Cited

U.S. PATENT DOCUMENTS

| | | | |
|---|---|---|---|
| 2012/0155298 A1* | 6/2012 | Yang | H04W 24/08 |
| | | | 370/252 |
| 2012/0320926 A1 | 12/2012 | Kamath et al. | |
| 2013/0320926 A1* | 12/2013 | Kerfoot, Jr. | H02J 7/0024 |
| | | | 320/117 |
| 2014/0153442 A1 | 6/2014 | Zhang et al. | |
| 2014/0269710 A1* | 9/2014 | Sundaram | H04L 45/302 |
| | | | 370/392 |

FOREIGN PATENT DOCUMENTS

| | | |
|---|---|---|
| CN | 201410751060.7 | 5/2018 |
| EP | 1422884 A1 | 5/2004 |

* cited by examiner

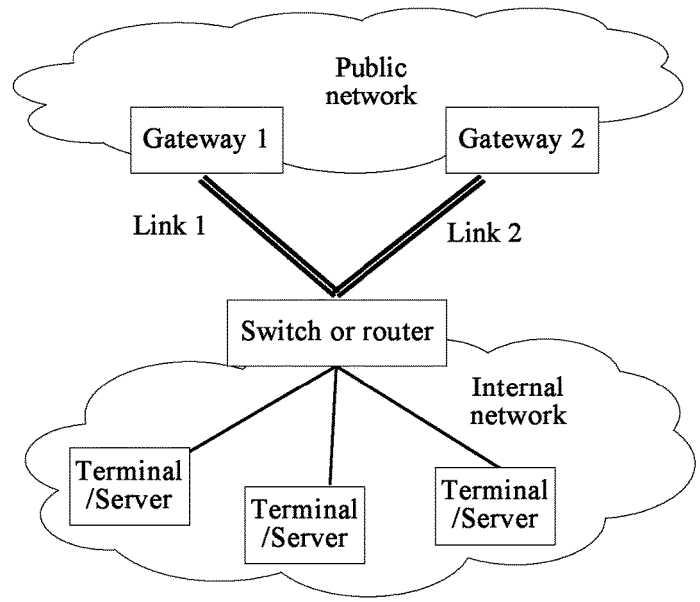

FIG. 1

| A first network device receives, through an inter-system cascade port, a first packet sent by a second network device, and adds a first remote RMT identifier to the first packet to obtain a second packet | ~ S201 |

| The first network device determines, according to the first RMT identifier in the second packet and an attribute of a sending port for the second packet, whether there is a need to perform pruning processing on the second packet; and if the sending port for the second packet is a multi-homed port, the first network device performs pruning processing on the second packet; or if the sending port for the second packet is a single-homed port, the first network device deletes the first RMT identifier in the second packet, and sends, after obtaining the first packet, the first packet through the single-homed port | ~ S202 |

FIG. 2

PACKET TRANSMISSION METHOD AND APPARATUS

CROSS-REFERENCE TO RELATED APPLICATION

This application claims priority to Chinese Patent Application No. 201410751060.7, filed on Dec. 9, 2014, which is hereby incorporated by reference in its entirety.

TECHNICAL FIELD

The present disclosure relates to communications technologies, and in particular, to a packet transmission method and an apparatus.

BACKGROUND

With the development of computer technologies and communications technologies, a network structure in an actual application is increasingly complex, which causes a switch or a router to possibly receive routing information sent by the switch or the router, thereby causing generation of a routing loop and a waste of link bandwidth resources.

In order to avoid generation of a routing loop, in the prior art, layer-3 routing uses a route poison reverse manner, multiprotocol label switching (MPLS for short) uses an MPLS label manner, and transparent interconnection of lots of links (TRILL) uses a virtual nickname manner to implement horizontal network segmentation. A principle of the horizontal network segmentation is: in a process of transmitting routing information, routing information that is received by a router from an interface is not allowed to be sent back from the interface, thereby avoiding generation of a routing loop to a certain degree.

In a network, a multi-homed connection-based networking structure is widely used to improve network reliability. The following provides a detailed description by taking a dual-homed connection as an example. FIG. 1 is a schematic diagram of a network connection in a multi-homed scenario. As shown in FIG. 1, when an internal network and an external public network are interconnected, one switch or router of the internal network is connected to a gateway 1 and a gateway 2 by using two links separately (namely, connected to the gateway 1 and gateway 2 in a dual-homed manner). Using the network split horizon principle in the prior art may prevent the gateway 1 from sending routing information back to the switch or router. However, the switch or router may still receive, through the gateway 2, routing information that is sent by the switch or router to the gateway 1, which still causes generation of a routing loop and a waste of link bandwidth resources. Therefore, it can be seen that the split horizon principle in the prior art cannot avoid generation of a routing loop in a multi-homed scenario.

SUMMARY

The present disclosure provides a packet transmission method and an apparatus, which implement high-reliability packet forwarding in a multi-homed scenario.

According to a first aspect, the present disclosure provides a packet transmission method, including:

receiving, by a first network device through an inter-system cascade port, a first packet sent by a second network device, and adding a first remote RMT identifier to the first packet to obtain a second packet, where the first RMT identifier is used to indicate that the second packet is not a local packet of the first network device; and determining, by the first network device according to the first RMT identifier in the second packet and an attribute of a sending port for the second packet, whether there is a need to perform pruning processing on the second packet, where the attribute of the sending port includes: a multi-homed port or a single-homed port; and when the sending port for the second packet is a multi-homed port, performing, by the first network device, pruning processing on the second packet; or when the sending port for the second packet is a single-homed port, deleting, by the first network device, the first RMT identifier in the second packet, and sending, after obtaining the first packet, the first packet through the single-homed port.

According to a second aspect, the present disclosure provides a packet transmission method, including:

determining, by a first network device, that a first packet needs to be sent to a second network device through an inter-system cascade port; and adding, by the first network device, a first remote RMT identifier to the first packet to obtain a second packet, and sending the second packet including the first RMT identifier to the second network device, so that the second network device determines, according to the first RMT identifier in the second packet and an attribute of a sending port for the second packet, whether there is a need to perform pruning processing on the second packet, where the first RMT identifier is used to indicate that the second packet is not a local packet of the second network device, and the attribute of the sending port includes: a multi-homed port or a single-homed port.

With reference to the second aspect, in a first possible implementation manner of the second aspect, when the first packet includes no initial RMT identifier, the adding, by the first network device, a first remote RMT identifier to the first packet to obtain a second packet includes:

adding, by the first network device, the first RMT identifier to the first packet directly to obtain the second packet.

According to a third aspect, the present disclosure provides a packet transmission method, including:

receiving, by a second network device through an inter-system cascade port, a second packet sent by a first network device, where the second packet includes a first remote RMT identifier, the first RMT identifier is used to indicate that the second packet is not a local packet of the second network device, and the second packet is obtained by adding, by the first network device, the first RMT identifier to a first packet; and determining, by the second network device according to the first RMT identifier in the second packet and an attribute of a sending port for the second packet, whether there is a need to perform pruning processing on the second packet, where the attribute of the sending port includes: a multi-homed port or a single-homed port; and when the sending port for the second packet is a multi-homed port, performing, by the second network device, pruning processing on the second packet; or when the sending port for the second packet is a single-homed port, deleting, by the second network device, the first RMT identifier in the second packet, and sending, after obtaining the first packet, the first packet through the single-homed port.

According to a fourth aspect, the present disclosure provides a network device, where the network device is a first network device, and the first network device includes:

an identifying module, configured to receive, through an inter-system cascade port, a first packet sent by a second network device, and add a first remote RMT identifier to the first packet to obtain a second packet, where the first RMT identifier is used to indicate that the second packet is not a local packet of the first network device; and a judging module, configured to determine, according to the first RMT identifier in the second packet and an attribute of a sending port for the second packet, whether there is a need to perform pruning processing on the second packet, where the attribute of the sending port includes: a multi-homed port or a single-homed port; and when the sending port for the second packet is a multi-homed port, perform pruning processing on the second packet; or when the sending port for the second packet is a single-homed port, delete the first RMT identifier in the second packet, and send, after obtaining the first packet, the first packet through the single-homed port.

According to a fifth aspect, the present disclosure provides a network device, where the network device is a first network device, and the first network device includes:

a determining module, configured to determine that a first packet needs to be sent to a second network device through an inter-system cascade port; and an identifying module, configured to add a first remote RMT identifier to the first packet to obtain a second packet, and send the second packet including the first RMT identifier to the second network device, so that the second network device determines, according to the first RMT identifier in the second packet and an attribute of a sending port for the second packet, whether there is a need to perform pruning processing on the second packet, where the first RMT identifier is used to indicate that the second packet is not a local packet of the second network device, and the attribute of the sending port includes: a multi-homed port or a single-homed port.

According to a sixth aspect, the present disclosure provides a network device, where the network device is a second network device, and the second network device includes:

a receiving module, configured to receive, through an inter-system cascade port, a second packet sent by a first network device, where the second packet includes a first remote RMT identifier, the first RMT identifier is used to indicate that the second packet is not a local packet of the second network device, and the second packet is obtained by adding, by the first network device, the first RMT identifier to a first packet; and a judging module, configured to determine, according to the first RMT identifier in the second packet and an attribute of a sending port for the second packet, whether there is a need to perform pruning processing on the second packet, where the attribute of the sending port includes: a multi-homed port or a single-homed port; and when the sending port for the second packet is a multi-homed port, perform pruning processing on the second packet; or when the sending port for the second packet is a single-homed port, delete the first RMT identifier in the second packet, and send, after obtaining the first packet, the first packet through the single-homed port.

In the present disclosure, a first network device receives, through an inter-system cascade port, a first packet sent by a second network device, and adds a first remote RMT identifier to the first packet to obtain a second packet, where the first RMT identifier is used to indicate that the second packet is not a local packet of the first network device. Further, the first network device determines, according to the first RMT identifier in the second packet and an attribute of a sending port for the second packet, whether there is a need to perform pruning processing on the second packet, where the attribute of the sending port includes: a multi-homed port or a single-homed port. If the sending port for the second packet is a multi-homed port, the first network device performs pruning processing on the second packet; or if the sending port for the second packet is a single-homed port, the first network device deletes the first RMT identifier in the second packet, and sends, after obtaining the first packet, the first packet through the single-homed port, thereby avoiding generation of a routing loop in a multi-homed scenario and implementing high-reliability packet forwarding in the multi-homed scenario, so that a system can be smoothly evolved.

BRIEF DESCRIPTION OF DRAWINGS

To describe the technical solutions in the embodiments of the present disclosure or in the prior art more clearly, the following briefly introduces the accompanying drawings required for describing the embodiments or the prior art.

FIG. 1 is a schematic diagram of a network connection in a multi-homed scenario;

FIG. 2 is a schematic flowchart of Embodiment 1 of a packet transmission method according to the present disclosure;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

FIG. 2 is a schematic flowchart of Embodiment 1 of a packet transmission method according to the present disclosure. A first network device and a second network device in this embodiment may be implemented by using software and/or hardware. Specifically, the first network device and the second network device may be a gateway. A solution in this embodiment may be applied to a wired network, a wireless network, an Ethernet, or another data network, so that multiple network devices (multi-homed) can implement high-reliability data forwarding at the same time. As shown in FIG. 2, the method in this embodiment may include:

S201. A first network device receives, through an inter-system cascade port, a first packet sent by a second network device, and adds a first remote RMT identifier to the first packet to obtain a second packet.

The first RMT identifier is used to indicate that the second packet is not a local packet of the first network device. The local packet of the first network device refers to a packet whose original packet is sent by a device that uses the first network device as a gateway. Therefore, the first RMT identifier is specifically used to indicate that an original packet of the second packet is not a packet sent by the device that uses the first network device as the gateway.

Figure 3A:
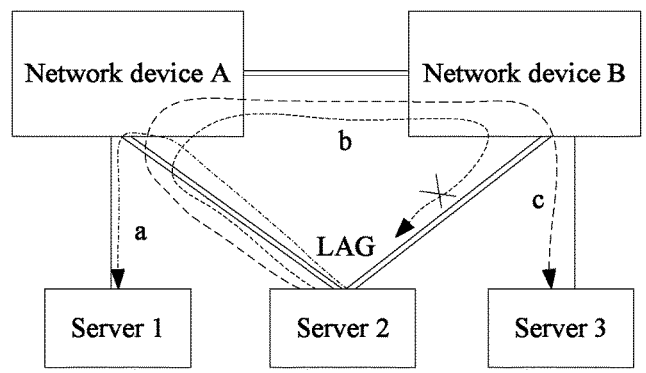
FIG. 3A is a first schematic diagram of an application scenario of a packet transmission method according to the present disclosure.

FIG. 3A is a first schematic diagram of an application scenario of a packet transmission method according to the present disclosure. As shown in FIG. 3A, a network device A and a network device B are interconnected through an inter-system cascade port between the network device A and the network device B; a server 2 accesses the network device A and the network device B in a dual-homed manner through a link aggregation group (LAG for short), where uplink packets in the server 2 are in a load sharing manner, and packet forwarding is implemented on both links (a port of the network device A for connecting to the server 2 is a dual-homed port, and a port of the network device B for connecting to the server 2 is also a dual-homed port); a server 1 is connected to the network device A in a single-homed manner (a port of the network device A for connecting to the server 1 is a single-homed port); and a server 3 is connected to the network device B in a single-homed manner (a port of the network device B for connecting to the server 3 is also a single-homed port). A local packet of a network device is preferentially forwarded. Packets that are sent by the server 1 and the server 2 to the network device A are local packets of the network device A; packets that are sent by the server 2 and the server 3 to the network device B are local packets of the network device B; and a packet that is sent by the server 2 to the network device A and that is forwarded to the network device B by the network device A is not a local packet of the network device B.

As shown in FIG. 3A, in this embodiment of the present disclosure, the second network device (the network device A in FIG. 3A) receives an original packet sent by the server 2. Optionally, the original packet is at least one type of the following packets: an unknown unicast packet, a broadcast packet, and a multicast packet. Further, the second network device sends the packet to the first network device (the network device B in FIG. 3A) through the inter-system cascade port; and the first network device receives the packet (used as a first packet in this embodiment) through the inter-system cascade port, and the first network device adds a first remote (RMT for short) identifier to the first packet to obtain a second packet, where the first RMT identifier is used to indicate that the second packet is not a local packet of the first network device. Optionally, the first network device may achieve, by reusing some flag bits of a label carried by the packet, a purpose of adding an RMT identifier, where the flag bit used to include an RMT identifier is called an RMT flag bit. Optionally, the first network device adds the first RMT identifier to the first packet by means of setting a non-canonical format indicator (CFI for short)/drop eligible indicator (DEI for short) flag bit to 1 (that is, the first RMT identifier is added to a CFI flag bit or a DEI flag bit of the first packet; in this case, the CFI/DEI flag bit is an RMT flag bit). For example, the packet carries an 802.1Q label. If a CFI flag bit of the label is set to 1, it indicates that the first RMT identifier has been added to the first packet. Optionally, the first network device may also add the first RMT identifier to the first packet by means of setting a priority code point (PCP for short) flag bit to 1 (that is, the first RMT identifier is added to a PCP flag bit of the first packet; in this case, the PCP flag bit is an RMT flag bit). For example, the first network device executes priority mapping for a packet received from a server, compresses 0~7 (3 bits) as 0~3 (2 bits), and uses a most significant bit that is idle to add the first RMT identifier to the first packet.

S202. The first network device determines, according to the first RMT identifier in the second packet and an attribute of a sending port for the second packet, whether there is a need to perform pruning processing on the second packet; and if the sending port for the second packet is a multi-homed port, the first network device performs pruning processing on the second packet; or if the sending port for the second packet is a single-homed port, the first network device deletes the first RMT identifier in the second packet, and sends, after obtaining the first packet, the first packet through the single-homed port.

If the first packet is an original packet, the first network device deletes the first RMT identifier in the second packet, and sends, after obtaining the first packet, the first packet directly through the single-homed port.

If the first packet is not an original packet, the first network device needs to further delete an RMT identifier in the second packet besides the first RMT identifier, to obtain the original packet, and sends the original packet through the single-homed port. In this embodiment of the present disclosure, in order to avoid generation of a routing loop, the first network device can learn, according to the first RMT identifier in the second packet, whether the packet is a local packet of the first network device. If learning that the packet is not a local packet of the first network device, the first network device further determines, according to the attribute of the sending port for the second packet, whether there is a need to perform pruning processing on the second packet, where the sending port is used by the first network device to send a packet to a device connecting to the first network device, and the attribute of the sending port includes: a multi-homed port or a single-homed port, where the multi-homed port is at least a dual-homed port. If the sending port for the second packet is a single-homed port, that is, a device (the server 3 shown in FIG. 3A) that is connected to the first network device through the single-homed port neither receives the packet nor is a source device of the packet, as indicated by a packet transmission line c shown in FIG. 3A, the first network device therefore deletes the first RMT identifier in the second packet, and sends, after obtaining the first packet, the first packet through the single-homed port. If the sending port for the second packet is a multi-homed port, that is, a device (the server 2 shown in FIG. 3A) that is connected to the first network device through the multi-homed port may be a source device that sends the first packet, or the server directly acquires the packet by using the second network device, as indicated by a packet transmission line b shown in FIG. 3A, the first network device therefore performs pruning processing on the second packet, that is, the first network device discards a packet that is sent to the device (the server 2 shown in FIG. 3A) through the multi-homed port, or the first network device does not send the second packet to the device through the multi-homed port.

Optionally, if a multicast packet received by the first network device (the multicast packet herein may be at least one type of the following packets: an unknown unicast packet, a broadcast packet, and a multicast packet) does not include any RMT identifier (that is, the multicast packet is a local packet of the first network device), the first network device normally forwards the multicast packet to all local multi-homed ports and single-homed ports, namely, a port of the first network device for connecting to an access switching device or a server/host, as indicated by a packet transmission line a shown in FIG. 3A.

In this embodiment of the present disclosure, a first network device receives, through an inter-system cascade port, a first packet sent by a second network device, and adds a first remote RMT identifier to the first packet to obtain a second packet, where the first RMT identifier is used to indicate that the second packet is not a local packet of the first network device. Further, the first network device determines, according to the first RMT identifier in the second packet and an attribute of a sending port for the second packet, whether there is a need to perform pruning processing on the second packet, where the attribute of the sending port includes: a multi-homed port or a single-homed port. If the sending port for the second packet is a multi-homed port, the first network device performs pruning processing on the second packet; or if the sending port for the second packet is a single-homed port, the first network device deletes the first RMT identifier in the second packet, and sends, after obtaining the first packet, the first packet through the single-homed port, thereby avoiding generation of a routing loop in a multi-homed scenario and implementing high-reliability packet forwarding in the multi-homed scenario, so that a system can be smoothly evolved.

In one implementation manner, if the first network device includes a backbone switching device, the method is specifically executed by the backbone switching device. In this case, step S201 includes:

receiving, by the backbone switching device through the inter-system cascade port, the first packet sent by the second network device, and adding the first RMT identifier to the first packet to obtain the second packet; and accordingly, step S202 includes: determining, by the backbone switching device according to the first RMT identifier in the second packet and the attribute of the sending port for the second packet, whether there is a need to perform pruning processing on the second packet.

The backbone switching device may be a layer-2 Ethernet switch, a layer-3 Ethernet switch, or a router device.

In another implementation manner, if the first network device includes a backbone switching device and a leaf device, where the backbone switching device and the leaf device are connected through an intra-system cascade port, step S201 includes: receiving, by the backbone switching device of the first network device through the inter-system cascade port, the first packet sent by the second network device, and adding the first RMT identifier to the first packet to obtain the second packet; and accordingly, step S202 includes: determining, by the leaf device of the first network device according to the first RMT identifier in the second packet and the attribute of the sending port for the second packet, whether there is a need to perform pruning processing on the second packet; and if the sending port for the second packet is a multi-homed port, performing, by the leaf device, pruning processing on the second packet; or if the sending port for the second packet is a single-homed port, deleting, by the leaf device, the first RMT identifier in the second packet, and sending, after obtaining the first packet, the first packet through the single-homed port.

Optionally, the adding a first remote RMT identifier to the first packet to obtain a second packet includes: if the first packet includes no initial RMT identifier, adding, by the first network device, the first RMT identifier to the first packet directly to obtain the second packet.

In this embodiment of the present disclosure, if the first packet includes no initial RMT identifier (that is, the source device of the first packet is a device connecting to the second network device), the first network device directly adds the first RMT identifier to the first packet in the foregoing manner of adding an RMT identifier, to obtain the second packet.

In another implementation manner, step S201 includes: if the first packet includes an initial RMT identifier, adding, by the first network device, the first RMT identifier based on the initial RMT identifier of the first packet to obtain the second packet; and accordingly, that the first network device determines, according to the first RMT identifier in the second packet and an attribute of a sending port for the second packet, whether there is a need to perform pruning processing on the second packet includes: determining, by the first network device according to the first RMT identifier in the second packet, the initial RMT identifier, and the attribute of the sending port for the second packet, whether there is a need to perform pruning processing on the second packet.

Figure 3B:
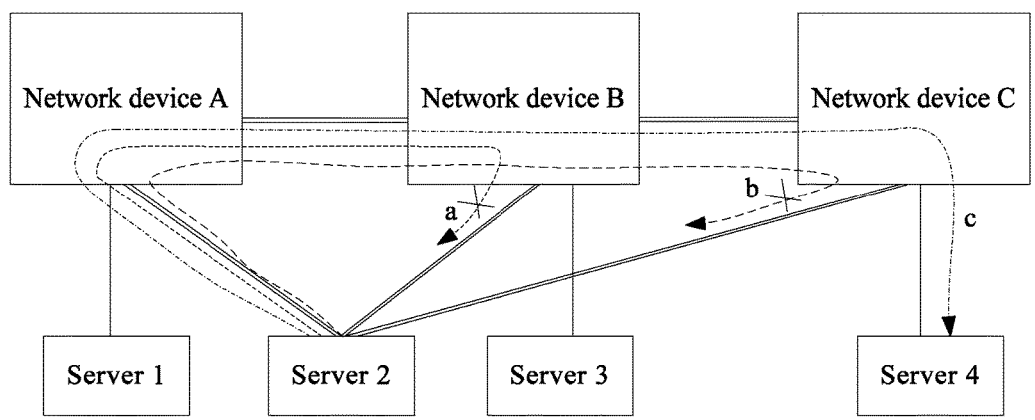
FIG. 3B is a second schematic diagram of an application scenario of a packet transmission method according to the present disclosure.

FIG. 3B is a second schematic diagram of an application scenario of a packet transmission method according to the present disclosure. As shown in FIG. 3B, the application scenario includes a network device A, a network device B, and a network device C, where the network device A and the network device B are interconnected through an inter-system cascade port between the network device A and the network device B, and the network device B and the network device C are interconnected through an inter-system cascade port between the network device B and the network device C; a server 2 is connected to the network device A, the network device B, and the network device C in a multi-homed manner (a port of the network device A for connecting to the server 2 is a multi-homed port, a port of the network device B for connecting to the server 2 is also a multi-homed port, a port of the network device C for connecting to the server 2 is also a multi-homed port), where uplink packets in the server 2 are in a load sharing manner, and packet forwarding is implemented on all three links; a server 1 is connected to the network device A in a single-homed manner; a server 3 is connected to the network device B in a single-homed manner; and a server 4 is connected to the network device C in a single-homed manner. A packet received by a network device is preferentially forwarded to a device that uses the network device as a gateway.

In this embodiment of the present disclosure, as shown in FIG. 3B, if the first packet that is received by the first network device (the network device C shown in FIG. 3B) and is sent by the second network device (the network device B shown in FIG. 3B) includes the initial RMT identifier, that is, the first packet is not a local packet of the second network device but a packet that is forwarded to the first network device by using the second network device, for example, the server 2 shown in FIG. 3B sends an original packet to the network device A, the network device A sends the original packet to the network device B, the network device B adds an initial RMT identifier to the original packet to obtain a first packet, where the initial RMT identifier is used to indicate that the first packet is not a local packet of the network device B, the network device B further sends the first packet to the network device C, and therefore the first packet that is received by the network device C and is sent by the network device B includes an initial RMT identifier, the first network device further adds, in the foregoing manner of adding an RMT identifier, the first RMT identifier based on the initial RMT identifier of the first packet to obtain the second packet. Optionally, the network device C adds the first RMT identifier by means of changing a value of a flag bit used to indicate an RMT identifier.

Optionally, in a scenario in which single-homing and multi-homing coexist, the flag bit used to indicate the RMT identifier may be extended for indicating a source network device of a packet and a network device through which the packet has passed. For example, in FIG. 3B, bits 0, 1, and 2 of a flag bit may be respectively used to indicate respective RMT identifiers of the network device A, the network device B, and the network device C (the RMT identifier of the network device A is 0x01, the RMT identifier of the network device B is 0x02, and the RMT identifier of the network device C is 0x04). Assuming that an original packet is a local packet of the network device A, when the original packet is forwarded from left to right, after receiving the original packet sent by the network device A, the network device B adds an initial RMT identifier (the initial RMT identifier is 1) to the original packet to obtain a first packet. Further, after receiving the first packet that is sent by the network device B and includes the initial RMT identifier, the network device C adds a first RMT identifier (the first RMT identifier is 2) based on the initial RMT identifier of the first packet to obtain a second packet carrying an updated RMT identifier (the updated RMT identifier is 3).

Further, in order to avoid generation of a routing loop, the first network device can learn, according to the first RMT identifier and the initial RMT identifier in the second packet, whether the second packet is a local packet of the first network device. If learning that the packet is not a local packet of the first network device, the first network device further determines, according to the attribute of the sending port for the second packet, whether there is a need to perform pruning processing on the second packet, where the attribute of the sending port includes: a multi-homed port or a single-homed port, where the multi-homed port is at least a dual-homed port. If the sending port for the second packet is a single-homed port, that is, a device (the server 4 shown in FIG. 3B) that is connected to the first network device through the single-homed port neither receives the packet nor is a source device of the packet, as indicated by a packet transmission line c shown in FIG. 3B, the first network device therefore deletes the initial RMT identifier and the first RMT identifier in the second packet, and sends, after obtaining the original packet, the original packet through the single-homed port. If the sending port for the second packet is a multi-homed port, that is, a device (the server 2 shown in FIG. 3B) that is connected to the first network device through the multi-homed port may be a source device that sends the original packet, or the server 2 directly acquires the original packet through the network device A, in order to avoid generation of a routing loop, the first network device therefore performs pruning processing on the second packet, that is, as indicated by a packet transmission line b shown in FIG. 3B, the network device C prunes (discards) a packet sent to the server 2.

Optionally, before step S201, the method further includes: configuring, by the first network device, a service forwarding entry, where the service forwarding entry is used for packet forwarding.

In this embodiment of the present disclosure, the first network device configures the service forwarding entry before receiving, through the inter-system cascade port, the first packet sent by the second network device, so as to deploy, according to the service forwarding entry, a forwarding entry learned on a single-homed port or a multi-homed port on a different intra-system cascade port and inter-system cascade port to guide correct packet forwarding.

Figure 4:
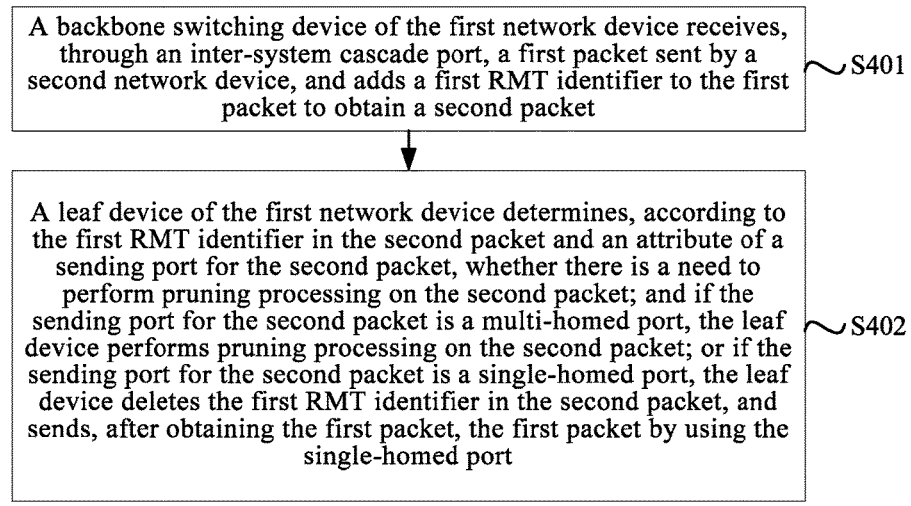
FIG. 4 is a schematic flowchart of Embodiment 2 of a packet transmission method according to the present disclosure.

FIG. 4 is a schematic flowchart of Embodiment 2 of a packet transmission method according to the present disclosure. Based on the foregoing embodiment, this embodiment describes in detail an implementation method when the first network device includes a backbone switching device and a leaf device, where the backbone switching device and the leaf device are connected through an intra-system cascade port. Optionally, the second network device may include only a backbone switching device, or include a backbone switching device and at least one leaf device. The following provides a description by using an example in which the second network device includes a backbone switching device and one leaf device. Optionally, the backbone switching device may be a layer-2 Ethernet switch, a layer-3 Ethernet switch, or a router device (optionally, may have a high-density port and a large capacity), and the leaf device may be a layer-2 or layer-3 switch (optionally, may have a high-density or low-density port and a small capacity). As shown in FIG. 4, the method in this embodiment may include:

S401. The backbone switching device of the first network device receives, through an inter-system cascade port, a first packet sent by the second network device, and adds a first RMT identifier to the first packet to obtain a second packet.

Figure 5A:
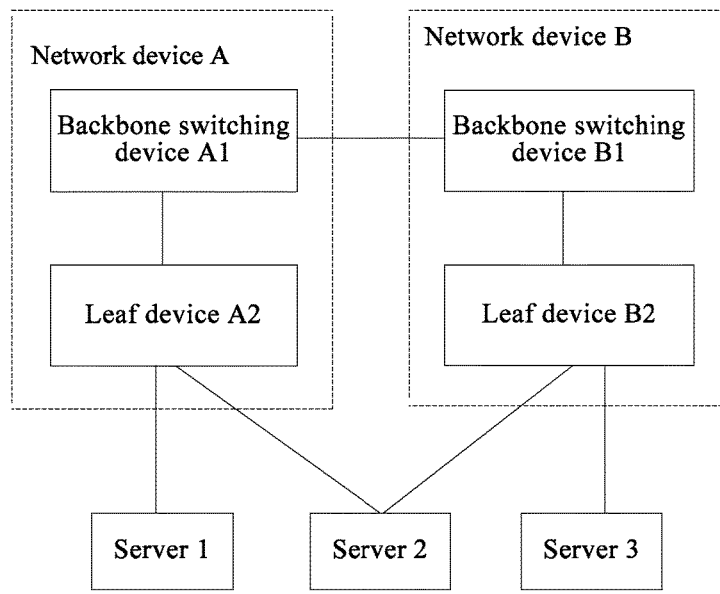
FIG. 5A is a third schematic diagram of an application scenario of a packet transmission method according to the present disclosure.

FIG. 5A is a third schematic diagram of an application scenario of a packet transmission method according to the present disclosure. As shown in FIG. 5A, a network device A and a network device B are interconnected through an inter-system cascade port between the network device A and the network device B, where the network device A includes a backbone switching device A1 and a leaf device A2, and the network device B includes a backbone switching device B1 and a leaf device B2; a server 2 is connected to the leaf device A2 and the leaf device B2 in a dual-homed manner, where uplink packets in the server 2 are in a load sharing manner, and packet forwarding is implemented on both links; a server 1 is connected to the leaf device A2 in a single-homed manner; and a server 3 is connected to the leaf device B2 in a single-homed manner. A local packet of a network device is preferentially forwarded.

As shown in FIG. 5A, in this embodiment of the present disclosure, the leaf device (the leaf device A2 shown in FIG. 5A) of the second network device receives an original packet sent by the server 2, where the original packet is a first packet in this implementation manner. Optionally, the first packet is at least one type of the following packets: an unknown unicast packet, a broadcast packet, and a multicast packet. Further, the leaf device of the second network device sends the first packet to the backbone switching device (the backbone switching device A1 in FIG. 5A) of the second network device. Further, the backbone switching device of the second network device sends the first packet to the backbone switching device (the backbone switching device B1 in FIG. 5A) of the first network device through the inter-system cascade port. The backbone switching device of the first network device receives the first packet through the inter-system cascade port, and the backbone switching device of the first network device adds a first RMT identifier to the first packet to obtain a second packet, where the first RMT identifier is used to indicate that the second packet is not a local packet of the first network device. For the manner of adding an RMT identifier, reference may be made to the description of the embodiment in FIG. 2.

S402. A leaf device of the first network device determines, according to the first RMT identifier in the second packet and an attribute of a sending port for the second packet, whether there is a need to perform pruning processing on the second packet; and if the sending port for the second packet is a multi-homed port, the leaf device performs pruning processing on the second packet; or if the sending port for the second packet is a single-homed port, the leaf device deletes the first RMT identifier in the second packet, and sends, after obtaining the first packet, the first packet through the single-homed port.

In this embodiment of the present disclosure, after adding the first RMT identifier to the first packet to obtain the second packet, the backbone switching device of the first network device sends the second packet to the leaf device (the leaf device B2 in FIG. 5A) of the first network device through the intra-system cascade port. In order to avoid generation of a routing loop, the leaf device of the first network device can learn, according to the first RMT identifier in the second packet, whether the original packet of the second packet is a local packet of the first network device. Because the second packet includes the first RMT identifier, the leaf device learns that the second packet is not a local packet of the first network device, and further determines, according to the attribute of the sending port for the second packet, whether there is a need to perform pruning processing on the second packet, where the attribute of the sending port includes: a multi-homed port or a single-homed port. If the sending port for the second packet is a single-homed port, that is, a device (the server 3 shown in FIG. 5A) connected through the single-homed port neither receives the packet nor is a source device of the packet, the leaf device therefore deletes the first RMT identifier in the second packet, and sends, after obtaining the first packet, the first packet through the single-homed port. If the sending port for the second packet is a multi-homed port, that is, a device (the server 2 shown in FIG. 5A) connected through the multi-homed port may be a source device that sends the first packet, or the server directly acquires the packet by using the second network device, the leaf device of the first network device therefore performs pruning processing on the second packet.

In one implementation manner, step S401 includes: if the first packet includes no initial RMT identifier, adding, by the backbone switching device of the first network device, the first RMT identifier to the first packet directly to obtain the second packet; and accordingly, step S402 includes: determining, by the leaf device of the first network device according to the first RMT identifier in the second packet and the attribute of the sending port for the second packet, whether there is a need to perform pruning processing on the second packet.

In another implementation manner, step S401 includes: if the first packet includes an initial RMT identifier, adding, by the backbone switching device of the first network device, the first RMT identifier based on the initial RMT identifier of the first packet to obtain the second packet; and accordingly, step S402 includes: determining, by the leaf device of the first network device according to the first RMT identifier in the second packet, the initial RMT identifier, and the attribute of the sending port for the second packet, whether there is a need to perform pruning processing on the second packet.

Figure 5B:
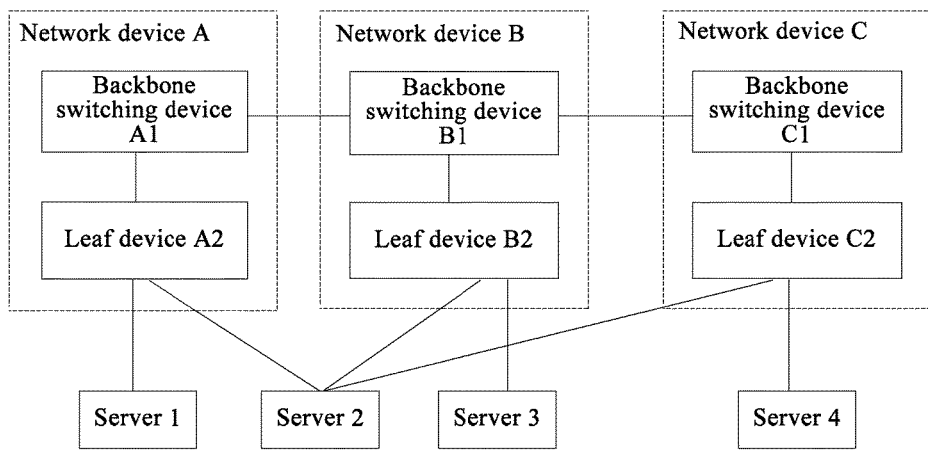
FIG. 5B is a fourth schematic diagram of an application scenario of a packet transmission method according to the present disclosure.

FIG. 5B is a fourth schematic diagram of an application scenario of a packet transmission method according to the present disclosure. As shown in FIG. 5B, the application scenario includes a network device A, a network device B, and a network device C, where the network device A and the network device B are interconnected through an inter-system cascade port between the network device A and the network device B, the network device B and the network device C are interconnected through an inter-system cascade port between the network device B and the network device C, the network device A includes a backbone switching device A1 and a leaf device A2, the network device B includes a backbone switching device B1 and a leaf device B2, and the network device C includes a backbone switching device C1 and a leaf device C2; a server 2 is connected to the leaf device A2, the leaf device B2, and the leaf device C2 in a multi-homed manner, where uplink packets in the server 2 are in a load sharing manner, and packet forwarding is implemented on all three links; a server 1 is connected to the leaf device A2 in a single-homed manner; a server 3 is connected to the leaf device B2 in a single-homed manner; and a server 4 is connected to the leaf device C2 in a single-homed manner. A local packet inside a network device is preferentially forwarded.

In this embodiment of the present disclosure, as shown in FIG. 5B, if the first packet that is received by the leaf device (the leaf device C2 shown in FIG. 5B) of the first network device and is sent by the backbone switching device (the backbone switching device B1 shown in FIG. 5B) of the second network device includes the initial RMT identifier, that is, the first packet is not a local packet of the second network device but a packet that is forwarded to the first network device through the second network device, for example, the server 2 shown in FIG. 5B sends an original packet to the leaf device A2 of the network device A, the leaf device A2 sends the original packet to the backbone switching device A1 of the network device A, the backbone switching device A1 of the network device A sends the original packet to the backbone switching device B1 of the network device B, the backbone switching device B1 of the network device B adds an initial RMT identifier to the original packet to obtain a first packet, where the initial RMT identifier is used to indicate that the first packet is not a local packet of the network device B, the backbone switching device B1 of the network device B further sends the first packet to the backbone switching device C1 of the network device C, and therefore the first packet that is received by the backbone switching device C1 and is sent by the network device B includes an initial RMT identifier, the backbone switching device of the first network device further adds, in the foregoing manner of adding an RMT identifier, the first RMT identifier based on the initial RMT identifier of the first packet (an updated RMT identifier is obtained) to obtain the second packet. Optionally, the backbone switching device C1 of the network device C adds the first RMT identifier by means of changing a value of a flag bit used to indicate an RMT identifier.

Further, the backbone switching device of the first network device sends the second packet including the updated RMT identifier to the leaf device of the first network device through the intra-system cascade port. The leaf device of the first network device can learn, according to the first RMT identifier and the initial RMT identifier in the second packet, whether the second packet is a local packet of the first network device. If learning that the second packet is not a local packet of the first network device, the leaf device of the first network device further determines, according to the attribute of the sending port for the second packet, whether there is a need to perform pruning processing on the second packet, where the attribute of the sending port includes: a multi-homed port or a single-homed port, where the multi-homed port is at least a dual-homed port. If the sending port for the second packet is a single-homed port, that is, a device (the server 4 shown in FIG. 5B) that is connected to the first network device through the single-homed port neither receives the packet nor is a source device of the packet, the leaf device of the first network device therefore deletes the first RMT identifier in the second packet, and sends, after obtaining the first packet, the first packet through the single-homed port. If the sending port for the second packet is a multi-homed port, that is, a device (the server 2 shown in FIG. 5B) that is connected to the first network device through the multi-homed port may be a source device that sends the original packet, or the server 2 directly acquires the packet through the leaf device A2 of the network device A, in order to avoid generation of a routing loop, the leaf device of the first network device therefore performs pruning processing on the second packet, that is, as shown in FIG. 5B, the leaf device C2 of the network device C prunes (discards) a packet sent to the server 2.

Optionally, before step S401, the method further includes:

configuring, by the backbone switching device of the first network device, a service forwarding entry, where the service forwarding entry is used for packet forwarding.

Figure 6:
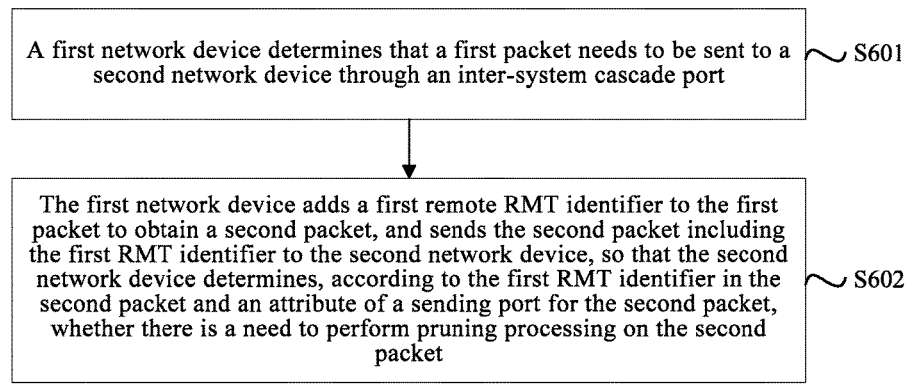
FIG. 6 is a schematic flowchart of Embodiment 3 of a packet transmission method according to the present disclosure.

FIG. 6 is a schematic flowchart of Embodiment 3 of a packet transmission method according to the present disclosure. A first network device and a second network device in this embodiment may be implemented by using software and/or hardware. A solution in this embodiment may be applied to a wired network, a wireless network, an Ethernet, or another data network, so that multiple network devices (multi-homed) can implement high-reliability data forwarding at the same time. As shown in FIG. 6, the method in this embodiment may include:

S601. A first network device determines that a first packet needs to be sent to a second network device through an inter-system cascade port.

In this embodiment of the present disclosure, as shown in FIG. 3A, the first network device (a network device A in FIG. 3A) receives an original packet sent by a server 2. Optionally, the original packet is at least one type of the following packets: an unknown unicast packet, a broadcast packet, and a multicast packet. Further, the first network device determines that the packet (used as a first packet in this embodiment) needs to be sent to the second network device (a network device B in FIG. 3A) through the inter-system cascade port.

S602. The first network device adds a first remote RMT identifier to the first packet to obtain a second packet, and sends the second packet including the first RMT identifier to the second network device, so that the second network device determines, according to the first RMT identifier in the second packet and an attribute of a sending port for the second packet, whether there is a need to perform pruning processing on the second packet.

The first RMT identifier is used to indicate that the second packet is not a local packet of the second network device. The local packet of the second network device refers to a packet whose original packet is sent by a device that uses the second network device as a gateway. Therefore, the first RMT identifier is specifically used to indicate that an original packet of the second packet is not a packet sent by the device that uses the second network device as the gateway.

In order to avoid generation of a routing loop, optionally, the first network device adds the first remote RMT identifier to the first packet to obtain the second packet, where the first RMT identifier is used to indicate that the second packet is not a local packet of the second network device, and sends the second packet including the first RMT identifier to the second network device, so that the second network device determines, according to the first RMT identifier in the second packet and the attribute of the sending port for the second packet (optionally, the attribute of the sending port includes: a multi-homed port or a single-homed port, where the multi-homed port is at least a dual-homed port), whether there is a need to perform pruning processing on the second packet, where the sending port is used by the second network device to send a packet to a device connecting to the second network device. If the sending port for the second packet is a multi-homed port, that is, a device (the server 2 shown in FIG. 3A) that is connected to the second network device through the multi-homed port may be a source device that sends the first packet, or the server 2 directly acquires the packet by using the first network device, the second network device therefore performs pruning processing on the second packet, that is, the second network device discards a packet that is sent to the device (the server 2 shown in FIG. 3A) through the multi-homed port, or the second network device does not send the second packet to the device through the multi-homed port. If the sending port for the second packet is a single-homed port, that is, a device (a server 3 shown in FIG. 3A) that is connected to the second network device through the single-homed port neither receives the packet nor is a source device of the packet, the second network device therefore deletes the first RMT identifier in the second packet, and sends, after obtaining the first packet, the first packet through the single-homed port.

Optionally, the first network device may achieve, by reusing some flag bits of a label carried by the packet, a purpose of adding an RMT identifier, where the flag bit used to include an RMT identifier is called an RMT flag bit. Optionally, the first network device adds the first RMT identifier to the first packet by means of setting a CFI/DEI flag bit to 1 (that is, the first RMT identifier is added to a CFI flag bit or a DEI flag bit of the first packet; in this case, the CFI/DEI flag bit is an RMT flag bit). Optionally, the first network device may also add the first RMT identifier to the first packet by means of setting a PCP flag bit to 1 (that is, the first RMT identifier is added to a PCP flag bit of the first packet; in this case, the PCP flag bit is an RMT flag bit).

Optionally, if the first packet includes no initial RMT identifier, that the first network device adds a first RMT identifier to the first packet to obtain a second packet includes: adding, by the first network device, the first RMT identifier to the first packet directly to obtain the second packet.

In this embodiment of the present disclosure, if the first packet includes no initial RMT identifier (that is, the source device of the first packet is a device connecting to the first network device), the first network device directly adds the first RMT identifier to the first packet in the foregoing manner of adding an RMT identifier, to obtain the second packet.

In another implementation manner, if the first packet includes an initial RMT identifier, that the first network device adds a first remote RMT identifier to the first packet to obtain a second packet includes: adding, by the first network device, the first RMT identifier based on the initial RMT identifier of the first packet to obtain the second packet.

In this embodiment of the present disclosure, as shown in FIG. 3B, if a packet that is received by the first network device (a network device C shown in FIG. 3B) and is sent by a network device B includes an initial RMT identifier, that is, the packet is not a local packet of the network device B but a packet that is forwarded to the first network device through the network device B, for example, a server 2 shown in FIG. 3B sends an original packet to a network device A, the network device A sends the original packet to the network device B, the network device B adds an initial RMT identifier to the original packet to obtain a first packet, where the initial RMT identifier is used to indicate that the first packet is not a local packet of the network device B, the network device B further sends the first packet to the network device C, and therefore the first packet that is received by the network device C and is sent by the network device B includes an initial RMT identifier; when the first network device determines that the first packet needs to be continuously sent to another network device (not shown in the figure) connecting to the first network device, the first network device further adds, in the foregoing manner of adding an RMT identifier, a first RMT identifier based on the initial RMT identifier of the first packet to obtain a second packet. Further, the first network device sends the second packet including the first RMT identifier to the another network device. Optionally, the first network device adds the first RMT identifier by means of changing a value of a flag bit used to indicate an RMT identifier. Optionally, in a scenario in which single-homing and multi-homing coexist, the flag bit used to indicate the RMT identifier may be extended for indicating a source network device of a packet and a network device through which the packet has passed. For specific details, refer to the foregoing embodiment, and details are not provided herein again.

In this embodiment of the present disclosure, a first network device determines that a first packet needs to be sent to a second network device through an inter-system cascade port. Further, the first network device adds a first remote RMT identifier to the first packet to obtain a second packet, and sends the second packet including the first RMT identifier to the second network device, so that the second network device determines, according to the first RMT identifier in the second packet and an attribute of a sending port for the second packet, whether there is a need to perform pruning processing on the second packet, and performs pruning processing on a second packet whose sending port is a multi-homed port, thereby avoiding generation of a routing loop in a multi-homed scenario and implementing high-reliability packet forwarding in the multi-homed scenario, so that a system can be smoothly evolved.

Optionally, before step S601, the method further includes: configuring, by the first network device, a service forwarding entry, where the service forwarding entry is used for packet forwarding.

Optionally, the first network device may include only a backbone switching device. Optionally, the first network device may further include a backbone switching device and at least one leaf device. Accordingly, step S601 includes: determining, by the backbone switching device of the first network device, that the first packet needs to be sent to the second network device through the inter-system cascade port; and step S602 includes: adding, by the backbone switching device, the first remote RMT identifier to the first packet to obtain the second packet, and sending the second packet including the first RMT identifier to the second network device, so that the second network device determines, according to the first RMT identifier in the second packet and the attribute of the sending port for the second packet, whether there is a need to perform pruning processing on the second packet.

Figure 7:
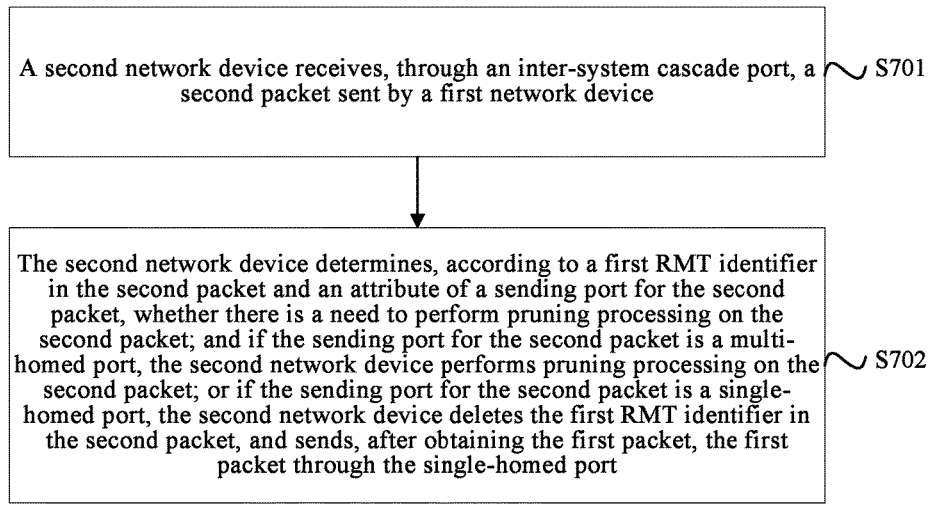
FIG. 7 is a schematic flowchart of Embodiment 4 of a packet transmission method according to the present disclosure.

FIG. 7 is a schematic flowchart of Embodiment 4 of a packet transmission method according to the present disclosure. A first network device and a second network device in this embodiment may be implemented by using software and/or hardware. Based on Embodiment 3 of the packet transmission method, this embodiment provides a detailed description for that the second network device receives a second packet that is sent by the first network device and includes the first RMT identifier, and determines, according to the first RMT identifier in the second packet and an attribute of a sending port for the second packet, whether there is a need to perform pruning processing on the second packet. As shown in FIG. 7, the method in this embodiment may include:

S701. A second network device receives, through an inter-system cascade port, a second packet sent by a first network device.

In this embodiment of the present disclosure, as shown in FIG. 3A, the second network device (a network device B shown in FIG. 3A) receives, through the inter-system cascade port, a packet (used as a second packet in this embodiment) sent by the first network device (a network device A shown in FIG. 3A), where the second packet is obtained by adding, by the first network device (the network device A shown in FIG. 3A), the first RMT identifier to a first packet; and the second packet includes a first remote RMT identifier, where the first RMT identifier is used to indicate that the second packet is not a local packet of the second network device. Optionally, the second packet is at least one type of the following packets: an unknown unicast packet, a broadcast packet, and a multicast packet.

S702. The second network device determines, according to a first RMT identifier in the second packet and an attribute of a sending port for the second packet, whether there is a need to perform pruning processing on the second packet; and if the sending port for the second packet is a multi-homed port, the second network device performs pruning processing on the second packet; or if the sending port for the second packet is a single-homed port, the second network device deletes the first RMT identifier in the second packet, and sends, after obtaining the first packet, the first packet through the single-homed port.

If the first packet is an original packet, the second network device deletes the first RMT identifier in the second packet, and directly sends, after obtaining the first packet, the first packet through the single-homed port.

If the first packet is not an original packet, the second network device needs to further delete an RMT identifier in the second packet besides the first RMT identifier, to obtain the original packet, and sends the original packet through the single-homed port.

In this embodiment of the present disclosure, the second network device can learn, according to the first RMT identifier in the second packet, whether the second packet is a local packet of the second network device. If learning that the second packet is not a local packet of the second network device, the second network device further determines, according to the attribute of the sending port for the second packet, whether there is a need to perform pruning processing on the second packet, where the sending port is used by the second network device to send a packet to a device connecting to the second network device, and the attribute of the sending port includes: a multi-homed port or a single-homed port, where the multi-homed port is at least a dual-homed port. If the sending port for the second packet is a single-homed port, that is, a device (a server 3 shown in FIG. 3A) that is connected to the second network device through the single-homed port neither receives the packet nor is a source device of the packet, the second network device therefore deletes the first RMT identifier in the second packet, and sends, after obtaining the first packet, the first packet through the single-homed port. If the sending port for the second packet is a multi-homed port, that is, a device (a server 2 shown in FIG. 3A) that is connected to the second network device through the multi-homed port may be a source device that sends the first packet, or the server directly acquires the first packet by using the first network device, the second network device therefore performs pruning processing on the second packet, that is, the second network device discards a packet that is sent to the device (the server 2 shown in FIG. 3A) through the multi-homed port, or the second network device does not send the second packet to the device through the multi-homed port. Optionally, if a multicast packet received by the second network device (the multicast packet herein may be at least one type of the following packets: an unknown unicast packet, a broadcast packet, and a multicast packet) does not include any RMT identifier (that is, the multicast packet is a local packet of the second network device), the second network device normally forwards the multicast packet to all local multi-homed ports and single-homed ports, namely, a port of the second network device for connecting to an access switching device or a server/host.

In this embodiment of the present disclosure, a second network device receives, through an inter-system cascade port, a second packet sent by a first network device. Further, the second network device determines, according to a first RMT identifier in the second packet and an attribute of a sending port for the second packet, whether there is a need to perform pruning processing on the second packet. If the sending port for the second packet is a multi-homed port, the second network device performs pruning processing on the second packet; or if the sending port for the second packet is a single-homed port, the second network device deletes the first RMT identifier in the second packet, and sends, after obtaining the first packet, the first packet through the single-homed port, thereby avoiding generation of a routing loop in a multi-homed scenario and implementing high-reliability packet forwarding in the multi-homed scenario, so that a system can be smoothly evolved.

In one implementation manner, if the second network device includes a backbone switching device, the method is specifically executed by the backbone switching device. In this case, step S701 includes:

receiving, by the backbone switching device through the inter-system cascade port, the second packet sent by the first network device; and accordingly, step S702 includes: determining, by the backbone switching device according to the first RMT identifier in the second packet and the attribute of the sending port for the second packet, whether there is a need to perform pruning processing on the second packet; and if the sending port for the second packet is a multi-homed port, performing, by the backbone switching device, pruning processing on the second packet; or if the sending port for the second packet is a single-homed port, deleting, by the backbone switching device, the first RMT identifier in the second packet, and sending, after obtaining the first packet, the first packet through the single-homed port.

In another implementation manner, if the second network device includes a backbone switching device and a leaf device, where the backbone switching device and the leaf device are connected through an intra-system cascade port, step S701 includes: receiving, by the backbone switching device of the second network device through the inter-system cascade port, the second packet sent by the first network device; and accordingly, step S702 includes: determining, by the leaf device of the second network device according to the first RMT identifier in the second packet and the attribute of the sending port for the second packet, whether there is a need to perform pruning processing on the second packet; and if the sending port for the second packet is a multi-homed port, performing, by the leaf device, pruning processing on the second packet; or if the sending port for the second packet is a single-homed port, deleting, by the leaf device, the first RMT identifier in the second packet, and sending, after obtaining the first packet, the first packet through the single-homed port.

In this embodiment of the present disclosure, as shown in FIG. 5A, a leaf device (a leaf device A2 in FIG. 5A) of the first network device receives an original packet sent by a server 2, where the original packet is a first packet in this implementation manner, and optionally, the first packet is at least one type of the following packets: an unknown unicast packet, a broadcast packet, and a multicast packet; the leaf device A2 sends the first packet to a backbone switching device (a backbone switching device A1 in FIG. 5A) of the first network device; further, when the backbone switching device of the first network device determines that the first packet needs to be sent to the first network device, the backbone switching device of the first network device adds a first RMT identifier to the first packet to obtain a second packet, where the first RMT identifier is used to indicate that the second packet is not a local packet of the second network device, and optionally, the backbone switching device of the first network device may achieve, by reusing some flag bits of a label carried by the packet, a purpose of adding an RMT identifier; further, the backbone switching device A1 sends the second packet including the first RMT identifier to the backbone switching device (a backbone switching device B1 in FIG. 5A) of the second network device (a network device B shown in FIG. 5A) through the inter-system cascade port; further, the backbone switching device B1 sends the second packet to the leaf device (a leaf device B2 in FIG. 5A) of the second network device through the intra-system cascade port; further, in order to avoid generation of a routing loop, the leaf device B2 determines, according to the first RMT identifier in the second packet and an attribute of a sending port for the second packet, whether there is a need to perform pruning processing on the second packet; and if the sending port for the second packet is a multi-homed port, the leaf device B2 performs pruning processing on the second packet; or if the sending port for the second packet is a single-homed port, the leaf device B deletes the first RMT identifier in the second packet, and sends, after obtaining the first packet, the first packet through the single-homed port.

Optionally, before step S701, the method further includes: configuring, by the second network device, a service forwarding entry, where the service forwarding entry is used for packet forwarding.

Figure 8:
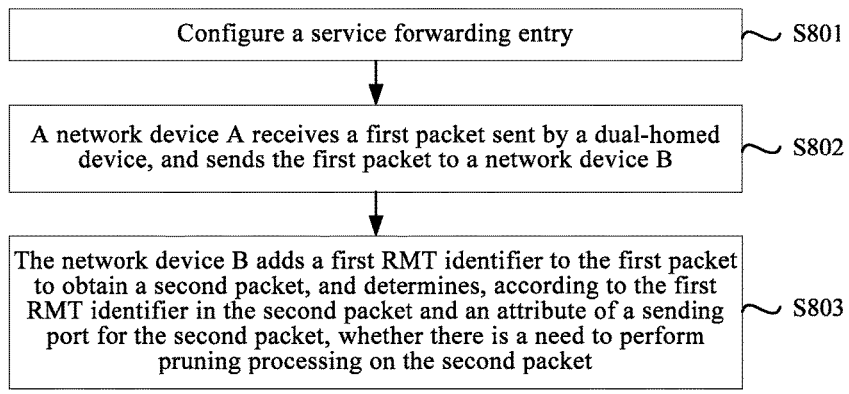
FIG. 8 is a schematic flowchart of Embodiment 5 of a packet transmission method according to the present disclosure.

FIG. 8 is a schematic flowchart of Embodiment 5 of a packet transmission method according to the present disclosure. As shown in FIG. 8, the method in this embodiment may include:

S801. Configure a service forwarding entry.

Figure 9:
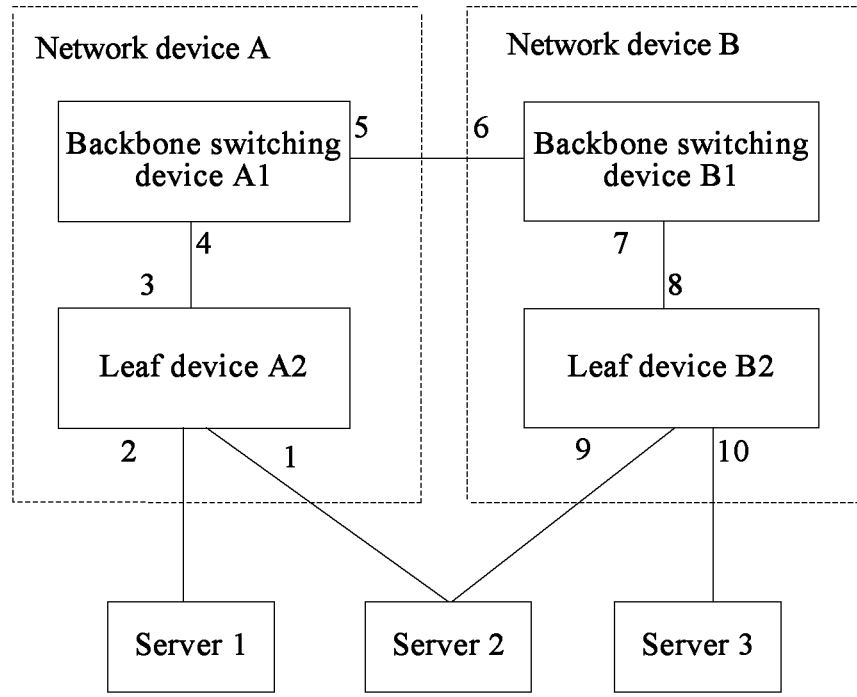
FIG. 9 is a fifth schematic diagram of an application scenario of a packet transmission method according to the present disclosure.

FIG. 9 is a fifth schematic diagram of an application scenario of a packet transmission method according to the present disclosure. As shown in FIG. 9, a network device A and a network device B are interconnected through an inter-system cascade port, where the network device A includes a backbone switching device A1 and a leaf device A2 (optionally, the backbone switching device A1 may connect to one or more leaf devices; and for ease of description, the following provides a detailed description by using an example in which one leaf device A2 is connected), and the network device B includes a backbone switching device B1 and a leaf device B2 (optionally, the backbone switching device B1 may connect to one or more leaf devices; and for ease of description, the following provides a detailed description by using an example in which one leaf device B2 is connected); a server 2 is connected to the leaf device A2 and the leaf device B2 in a dual-homed manner, where uplink packets in the server 2 are in a load sharing manner, and packet forwarding is implemented on both links; a server 1 is connected to the leaf device A2 in a single-homed manner; and a server 3 is connected to the leaf device B2 in a single-homed manner. A local packet of a network device is preferentially forwarded.

In this embodiment of the present disclosure, as shown in FIG. 9, (1) based on inter-system cascade ports 5 and 6 between the network device A and the network device B, a dual-homed link of the server 2 is configured as an MCLAG by means of negotiation; (2) the leaf device A2 learns a MAC address of the server 2 on an access port 1, and synchronizes, inside the network device A, the MAC address of the server 2 to an intra-system cascade port 4 of the backbone switching device A1; and the backbone switching device A1 sends the MAC address of the server 2 to the network device B through an inter-system cascade link synchronization channel, and the network device B delivers the MAC address of the server 2 to an intra-system cascade port 7 of the backbone switching device B1 and an access port 9 of the leaf device B2; and (3) the leaf device A2 learns a MAC address of the server 1 (single-homed device) on an access port 2, and synchronizes, inside the network device A, the MAC address of the server 1 to the intra-system cascade port 4 of the backbone switching device A1; and the backbone switching device A1 sends the MAC address of the server 1 to the network device B through the inter-system cascade link synchronization channel, and the network device B delivers the MAC address of the server 1 to an inter-system cascade port 6 of the backbone switching device B1 and an intra-system cascade port 8 of the leaf device B2. Similarly, a MAC address of the server 3 is delivered to ports 10, 7, 5 and 3, and details are not provided herein again.

S802. A network device A receives a first packet sent by a dual-homed device, and sends the first packet to a network device B.

In this embodiment of the present disclosure, (1) the leaf device A2 receives, from the access port 1 (a dual-homed port), an original packet sent by the server 2, where the original packet is a first packet in this implementation manner, and optionally, the first packet is at least one type of the following packets: an unknown unicast packet, a broadcast packet, and a multicast packet; and the leaf device A2 copies, based on a VLAN, the first packet to the port 2 for sending the first packet to the server 1, and sends the first packet to the backbone switching device A1 through the uplink port 3; and (2) the backbone switching device A1 receives the first packet from the internal cascade port 4, copies, based on the VLAN, the first packet to relevant ports of another leaf device and another backbone switching device inside the network device, and sends the first packet to the backbone switching device B1 of the network device B through the inter-system cascade port 5.

A unicast packet (layer 2 and layer 3) between the server 1 and the server 2 that are connected to the network device A is first locally and directly forwarded on the leaf device 1, and cannot be indirectly forwarded to the backbone switching device B1 and the leaf device B2. A unicast packet between a terminal device, directly connected to another leaf device and another backbone switching device (not shown in the figure) inside the network device A, and the server 2 is also first locally and directly forwarded inside the network device A, and cannot be indirectly forwarded to the backbone switching device B1 and the leaf device B2.

For a packet sent by another server (such as a Server 4) connected to the network device A (optionally, the packet is at least one type of the following packets: an unknown unicast packet, a broadcast packet, and a multicast packet), when the leaf device A2 directly copies, based on the VLAN, the packet to the access port 1 of the server 2, the leaf device 2 can normally forward the packet to the server 2 because the packet does not include an RMT identifier.

Optionally, in order to prevent the network device A from regarding that an original packet sent by another device (such as the server 1, the server 2, or the server 3) of the network device A is a non-local packet and discarding the original packet sent to a dual-homed port, because an RMT flag bit in the original packet has been set to 1 (the RMT flag bit is used to include an RMT identifier), it may be set in implementation of the present disclosure: setting an RMT flag bit to zero in an ingress direction of receiving a packet for all ports except the intra-system cascade port 3 on the leaf device A2, where this operation is not involved if a label carried by the packet does not include the RMT flag bit. Similarly, an RMT flag bit is set to zero in an ingress direction of receiving a packet for all ports except the intra-system cascade port 8 on the leaf device B2 of the network device B.

S803. The network device B adds a first RMT identifier to the first packet to obtain a second packet, and determines, according to the first RMT identifier in the second packet and an attribute of a sending port for the second packet, whether there is a need to perform pruning processing on the second packet.

In this embodiment of the present disclosure, (1) the backbone switching device B1 receives, through the inter-system cascade port 6, the first packet sent by the backbone switching device A1; the backbone switching device B1 adds, based on an ingress direction of the port 6, the first RMT identifier to the first packet to obtain the second packet, where the first RMT identifier is used to indicate that the second packet is not a local packet of the backbone switching device B1; and the backbone switching device B1 copies, based on the VLAN, the second packet including the first RMT identifier to relevant ports of another leaf device and another backbone switching device inside the network device B, and sends the second packet to the leaf device B2 through the intra-system cascade port 7; and (2) the leaf device B2 receives the second packet from the intra-system cascade port 8; and because the second packet includes the first RMT identifier and the port 9 connecting to the server 2 is a dual-homed port, in order to avoid generation of a routing loop, the leaf device B2 performs pruning processing on the second packet, that is, the leaf device B2 prunes (discards) the second packet that is sent to the server 2 through the port 9. Because the port 10 is a single-homed port, after obtaining the first packet by deleting the first RMT identifier in the second packet, the leaf device B2 copies, based on the VLAN, the first packet to the access port 10 for sending the first packet to the server 3.

Optionally, when the leaf device B2 receives the first packet sent by the server 2, where optionally, the first packet is at least one type of the following packets: an unknown packet, a broadcast packet, and a multicast packet, the first packet is processed on the network device B according to local preferential forwarding. Further, the backbone switching device A1 receives the first packet through the inter-system cascade port 5, and adds, based on an ingress direction of the inter-system cascade port 5, the first RMT identifier to the first packet received through the port 5, to obtain the second packet. Further, the leaf device A2 determines, according to the first RMT identifier in the second packet and the attribute of the sending port for the second packet, whether there is a need to perform pruning processing on the second packet. For specific details, refer to the foregoing part of this embodiment, and specific details are not provided herein again.

Figure 10:
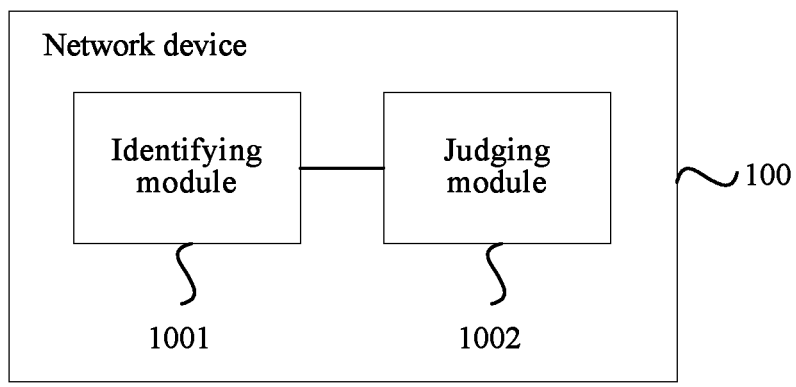
FIG. 10 is a schematic structural diagram of Embodiment 1 of a network device according to the present disclosure.

FIG. 10 is a schematic structural diagram of Embodiment 1 of a network device according to the present disclosure. Optionally, the network device is a first network device. As shown in FIG. 10, the network device 100 provided in this embodiment may include an identifying module 1001 and a judging module 1002.

The identifying module 1001 is configured to receive, through an inter-system cascade port, a first packet sent by a second network device, and add a first remote RMT identifier to the first packet to obtain a second packet, where the first RMT identifier is used to indicate that the second packet is not a local packet of the first network device.

The judging module 1002 is configured to determine, according to the first RMT identifier in the second packet and an attribute of a sending port for the second packet, whether there is a need to perform pruning processing on the second packet, where the attribute of the sending port includes: a multi-homed port or a single-homed port; and if the sending port for the second packet is a multi-homed port, perform pruning processing on the second packet; or if the sending port for the second packet is a single-homed port, delete the first RMT identifier in the second packet, and send, after obtaining the first packet, the first packet through the single-homed port.

Optionally, if the first network device includes a backbone switching device, the backbone switching device includes the identifying module 1001 and the judging module 1002.

Optionally, if the first network device includes a backbone switching device and a leaf device, where the backbone switching device and the leaf device are connected through an intra-system cascade port, the backbone switching device includes the identifying module 1001, and the leaf device includes the judging module 1002, where the identifying module is specifically configured to: receive, through the inter-system cascade port, the first packet sent by the second network device, and add the first RMT identifier to the first packet to obtain the second packet; and accordingly, the judging module is specifically configured to: determine, according to the first RMT identifier in the second packet and the attribute of the sending port for the second packet, whether there is a need to perform pruning processing on the second packet; and if the sending port for the second packet is a multi-homed port, perform pruning processing on the second packet; or if the sending port for the second packet is a single-homed port, delete the first RMT identifier in the second packet, and send, after obtaining the first packet, the first packet through the single-homed port.

Optionally, the identifying module 1001 is specifically configured to: if the first packet includes no initial RMT identifier, add the first RMT identifier to the first packet directly to obtain the second packet.

Optionally, the identifying module 1001 is specifically configured to: if the first packet includes an initial RMT identifier, add the first RMT identifier based on the initial RMT identifier of the first packet; and accordingly, the judging module 1002 is specifically configured to: determine, according to the first RMT identifier in the second packet, the initial RMT identifier, and the attribute of the sending port for the second packet, whether there is a need to perform pruning processing on the second packet.

Optionally, the first RMT identifier is added to a non-canonical Format indicator CFI flag bit or a drop eligible indicator DEI flag bit of the first packet; or the first RMT identifier is added to a priority code point PCP flag bit of the first packet.

Optionally, the first network device further includes:
a configuring module, configured to configure a service forwarding entry, where the service forwarding entry is used for packet forwarding.

The network device in this embodiment may be configured to execute any technical solution in Embodiment 1, Embodiment 2, and Embodiment 5 in the present disclosure. An implementation principle and a technical effect of the network device are similar to those of the technical solution, and details are not provided herein again.

Figure 11:
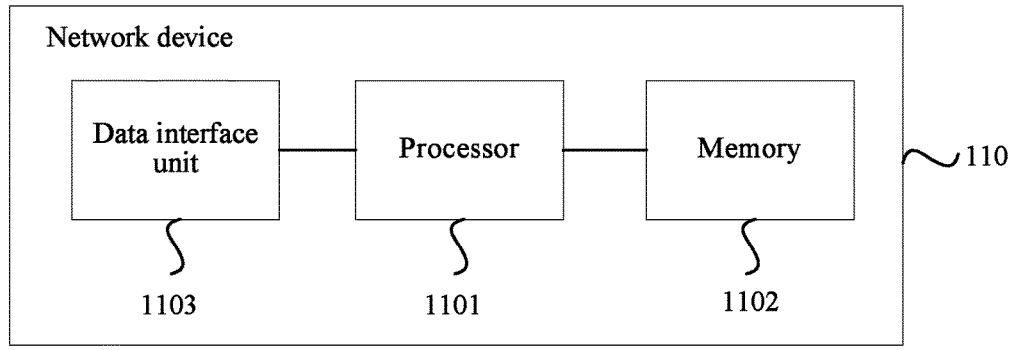
FIG. 11 is a schematic structural diagram of Embodiment 2 of a network device according to the present disclosure.

FIG. 11 is a schematic structural diagram of Embodiment 2 of a network device according to the present disclosure. Optionally, the network device is a first network device. As shown in FIG. 11, the network device 110 provided in this embodiment may include a processor 1101 and a memory 1102. The network device 110 may further include a data interface unit 1103, where the data interface unit 1103 may be connected to the processor 1101. The data interface unit 1103 is configured to receive/send a packet. The memory 1102 is configured to store an execution instruction. When the network device 110 runs, the processor 1101 invokes the execution instruction in the memory 1102 to execute the operations in Embodiment 1, Embodiment 2, and Embodiment 5.

The network device in this embodiment may be configured to execute the technical solutions in Embodiment 1, Embodiment 2, and Embodiment 5 in the present disclosure. An implementation principle and a technical effect of the network device are similar to those of the technical solutions, and details are not provided herein again.

Figure 12:
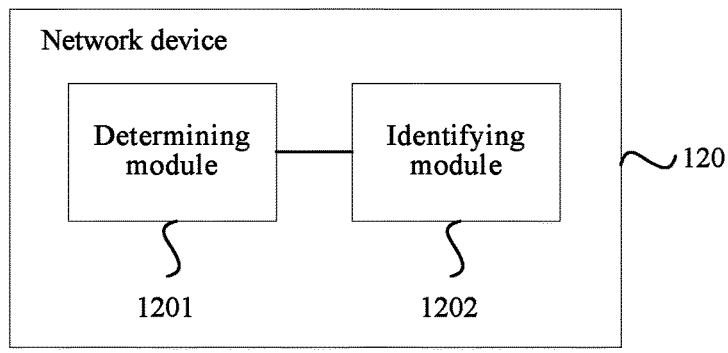
FIG. 12 is a schematic structural diagram of Embodiment 3 of a network device according to the present disclosure.

FIG. 12 is a schematic structural diagram of Embodiment 3 of a network device according to the present disclosure. Optionally, the network device is a first network device. As shown in FIG. 12, the network device 120 provided in this embodiment may include a determining module 1201 and an identifying module 1202.

The determining module 1201 is configured to determine that a first packet needs to be sent to a second network device through an inter-system cascade port.

The identifying module 1202 is configured to add a first remote RMT identifier to the first packet to obtain a second packet, and send the second packet including the first RMT identifier to the second network device, so that the second network device determines, according to the first RMT identifier in the second packet and an attribute of a sending port for the second packet, whether there is a need to perform pruning processing on the second packet, where the first RMT identifier is used to indicate that the second packet is not a local packet of the second network device, and the attribute of the sending port includes: a multi-homed port or a single-homed port.

Optionally, if the first packet includes no initial RMT identifier, the identifying module is specifically configured to add the first RMT identifier to the first packet directly to obtain the second packet.

Optionally, if the first packet includes an initial RMT identifier, the identifying module is specifically configured to add the first RMT identifier based on the initial RMT identifier of the first packet to obtain the second packet.

Optionally, the first RMT identifier is added to a non-canonical Format indicator CFI flag bit or a drop eligible indicator DEI flag bit of the first packet; or the first RMT identifier is added to a priority code point PCP flag bit of the first packet.

Optionally, the first network device further includes:

a configuring module, configured to configure a service forwarding entry, where the service forwarding entry is used for packet forwarding.

The network device in this embodiment may be configured to execute any technical solution in Embodiment 3 and Embodiment 5 in the present disclosure. An implementation principle and a technical effect of the network device are similar to those of the technical solution, and details are not provided herein again.

Figure 13:
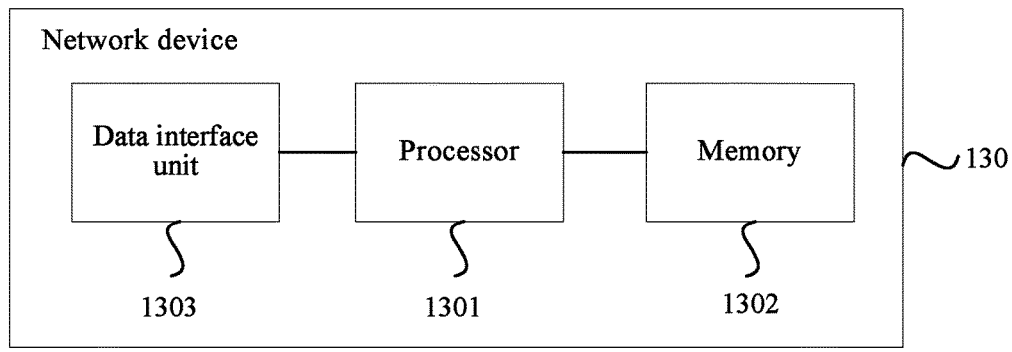
FIG. 13 is a schematic structural diagram of Embodiment 4 of a network device according to the present disclosure.

FIG. 13 is a schematic structural diagram of Embodiment 4 of a network device according to the present disclosure. Optionally, the network device is a first network device. As shown in FIG. 13, the network device 130 provided in this embodiment may include a processor 1301 and a memory 1302. The network device 130 may further include a data interface unit 1303, where the data interface unit 1303 may be connected to the processor 1301. The data interface unit 1303 is configured to receive/send a packet. The memory 1302 is configured to store an execution instruction. When the network device 130 runs, the processor 1301 invokes the execution instruction in the memory 1302 to execute the operations in Embodiment 3 and Embodiment 5.

The network device in this embodiment may be configured to execute the technical solutions in Embodiment 3 and Embodiment 5 in the present disclosure. An implementation principle and a technical effect of the network device are similar to those of the technical solutions, and details are not provided herein again.

Figure 14:
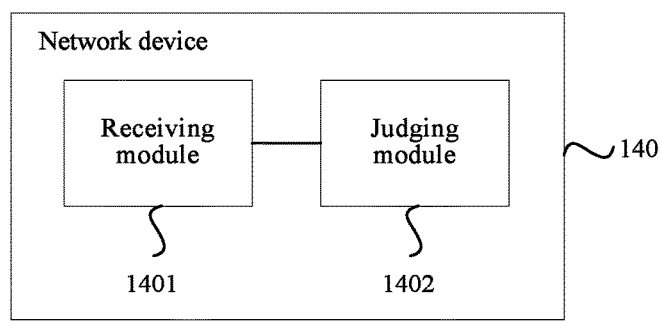
FIG. 14 is a schematic structural diagram of Embodiment 5 of a network device according to the present disclosure.

FIG. 14 is a schematic structural diagram of Embodiment 5 of a network device according to the present disclosure. Optionally, the network device is a second network device. As shown in FIG. 14, the network device 140 provided in this embodiment may include a receiving module 1401 and a judging module 1402.

The receiving module 1401 is configured to receive, through an inter-system cascade port, a second packet sent by a first network device, where the second packet includes a first remote RMT identifier, the first RMT identifier is used to indicate that the second packet is not a local packet of the second network device, and the second packet is obtained by adding, by the first network device, the first RMT identifier to a first packet.

The judging module 1402 is configured to determine, according to the first RMT identifier in the second packet and an attribute of a sending port for the second packet, whether there is a need to perform pruning processing on the second packet, where the attribute of the sending port includes: a multi-homed port or a single-homed port; and if the sending port for the second packet is a multi-homed port, perform pruning processing on the second packet; or if the sending port for the second packet is a single-homed port, delete the first RMT identifier in the second packet, and send, after obtaining the first packet, the first packet through the single-homed port.

Optionally, if the second network device includes a backbone switching device, the backbone switching device includes the receiving module and the judging module.

Optionally, if the second network device includes a backbone switching device and a leaf device, where the backbone switching device and the leaf device are connected through an intra-system cascade port, the backbone switching device includes the receiving module, and the leaf device includes the judging module, where the receiving module is specifically configured to:

receive, through the inter-system cascade port, the second packet sent by the first network device; and accordingly, the judging module is specifically configured to:

determine, according to the first RMT identifier in the second packet and the attribute of the sending port for the second packet, whether there is a need to perform pruning processing on the second packet; and if the sending port for the second packet is a multi-homed port, perform pruning processing on the second packet; or if the sending port for the second packet is a single-homed port, delete the first RMT identifier in the second packet, and send, after obtaining the first packet, the first packet through the single-homed port.

Optionally, the second network device further includes:

a configuring module, configured to configure a service forwarding entry, where the service forwarding entry is used for packet forwarding.

The network device in this embodiment may be configured to execute any technical solution in Embodiment 4 and Embodiment 5 in the present disclosure. An implementation principle and a technical effect of the network device are similar to those of the technical solution, and details are not provided herein again.

Figure 15:
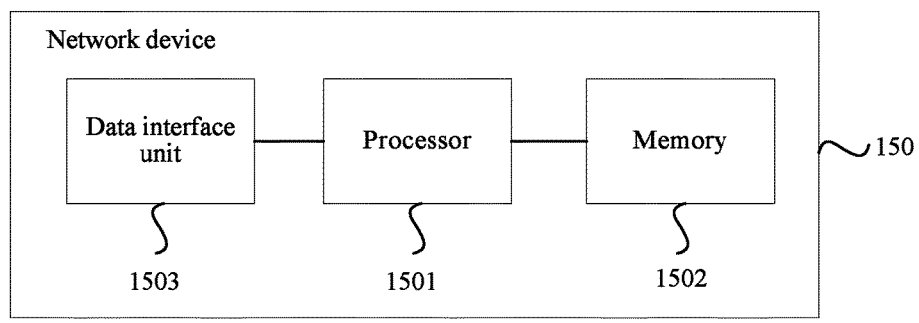
FIG. 15 is a schematic structural diagram of Embodiment 6 of a network device according to the present disclosure.

FIG. 15 is a schematic structural diagram of Embodiment 6 of a network device according to the present disclosure. Optionally, the network device is a second network device. As shown in FIG. 15, the network device 150 provided in this embodiment may include a processor 1501 and a memory 1502. The network device 150 may further include a data interface unit 1503, where the data interface unit 1503 may be connected to the processor 1501. The data interface unit 1503 is configured to receive/send a packet. The memory 1502 is configured to store an execution instruction. When the network device 150 runs, the processor 1501 invokes the execution instruction in the memory 1502 to execute the operations in Embodiment 4 and Embodiment 5.

The network device in this embodiment may be configured to execute the technical solutions in Embodiment 4 and Embodiment 5 in the present disclosure. An implementation principle and a technical effect of the network device are similar to those of the technical solutions, and details are not provided herein again.

Persons of ordinary skill in the art may understand that all or some of the steps of the foregoing method embodiments may be implemented by a program instructing relevant hardware. The foregoing program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of the corresponding technical solutions to depart from the scope of the technical solutions of the embodiments of the present disclosure.

What is claimed is:

1. A packet transmission method comprising:
    receiving, by a first network device through an inter-system cascade port, a first packet sent by a second network device, wherein the first packet comprises an initial remote (RMT) identifier;
    adding, by the first network device, a first remote (RMT) identifier to the first packet based on the initial RMT identifier, to obtain a second packet, wherein the first RMT identifier is used to indicate that the second packet is not a local packet of the first network device;
    determining, by the first network device according to the first and initial RMT identifiers in the second packet and an attribute of a sending port for the second packet, whether to perform pruning processing on the second packet, wherein the attribute of the sending port comprises: a multi-homed port or a single-homed port; and
    a) when the sending port for the second packet is a multi-homed port, performing, by the first network device, pruning processing on the second packet; and
    b) when the sending port for the second packet is a single-homed port, deleting, by the first network device, the first and initial RMT identifiers in the second packet to obtain the first packet, and sending the first packet through the single-homed port.

2. The method according to claim 1, wherein the first network device comprises a backbone switching device, the method is executed by the backbone switching device.

3. The method according to claim 1, wherein the first network device comprises a backbone switching device and a leaf device, wherein the backbone switching device and the leaf device are connected through an intra-system cascade port,
    wherein receiving, by the first network device through the inter-system cascade port, the first packet sent by the second network device, and adding the first RMT identifier to the first packet to obtain the second packet comprises:
    receiving, by the backbone switching device of the first network device through the inter-system cascade port, the first packet sent by the second network device, and adding the first RMT identifier to the first packet to obtain the second packet; and
    wherein determining whether to perform the pruning processing on the second packet comprises:
    determining, by the leaf device of the first network device according to the first RMT identifier and the initial RMT identifier in the second packet and the attribute of the sending port for the second packet, whether to perform pruning processing on the second packet; and
    a) when the sending port for the second packet is a multi-homed port, performing, by the leaf device, pruning processing on the second packet; or
    b) when the sending port for the second packet is a single-homed port, deleting, by the leaf device, the first RMT identifier and the initial RMT identifier in the second packet to obtain the first packet, and sending the first packet through the single-homed port.

4. The method according to claim 1, wherein the first RMT identifier is added to a non-canonical format indicator (CFI) flag bit or a drop eligible indicator (DEI) flag bit of the first packet.

5. The method according to claim 1, wherein the first RMT identifier is added to a priority code point (PCP) flag bit of the first packet.

6. A packet transmission method comprising:
    receiving, by a second network device through an inter-system cascade port, a second packet sent by a first network device, wherein the second packet comprises a first remote (RMT) identifier indicating that the second packet is not a local packet of the second network device, and the second packet further comprises an initial RMT identifier;
    determining, by the second network device according to the first and initial RMT identifiers in the second packet and an attribute of a sending port for the second packet, whether to perform pruning processing on the second packet, wherein the attribute of the sending port comprises: a multi-homed port or a single-homed port; and
    a) when the sending port for the second packet is a multi-homed port, performing, by the second network device, pruning processing on the second packet; and
    b) when the sending port for the second packet is a single-homed port, deleting, by the second network device, the first RMT identifier and the initial RMT identifier in the second packet to obtain a first packet, and sending the first packet through the single-homed port.

7. The method according to claim 6, wherein when the second network device comprises a backbone switching device, the method is executed by the backbone switching device.

8. The method according to claim 6, wherein when the second network device comprises a backbone switching device and a leaf device, wherein the backbone switching device and the leaf device are connected through an intra-system cascade port,
    wherein receiving the second packet sent by the first network device comprises:

receiving, by the backbone switching device of the second network device through the inter-system cascade port, the second packet sent by the first network device; and wherein determining whether it is necessary to perform the pruning processing on the second packet comprises:
determining, by the leaf device of the second network device according to the first and initial RMT identifiers in the second packet and the attribute of the sending port for the second packet, whether to perform pruning processing on the second packet; and
a) when the sending port for the second packet is a multi-homed port, performing, by the leaf device of the second network device, pruning processing on the second packet; or
b) when the sending port for the second packet is a single-homed port, deleting, by the leaf device of the second network device, the first RMT and initial identifiers in the second packet to obtain the first packet, and sending the first packet through the single-homed port.

9. A network device, wherein the network device is a first network device, and the first network device comprises:
a memory configured to store program codes; and
a processor configured to execute the program codes to:
receive, through an inter-system cascade port, a first packet comprising an initial remote (RMT) identifier, sent by a second network device, and
add a first RMT identifier, which is based on the initial RMT identifier, to the first packet to obtain a second packet, wherein the first RMT identifier is used to indicate that the second packet is not a local packet of the first network device; and
determine, according to the first and initial RMT identifiers in the second packet and an attribute of a sending port for the second packet, whether to perform pruning processing on the second packet, wherein the attribute of the sending port comprises: a multi-homed port or a single-homed port; and
a) when the sending port for the second packet is a multi-homed port, perform pruning processing on the second packet; and
b) when the sending port for the second packet is a single-homed port, delete the first and initial RMT identifier identifiers in the second packet to obtain the first packet, and send the first packet through the single-homed port.

10. The network device according to claim 9, wherein the first network device comprises a backbone switching device, the backbone switching device comprises the processor.

11. The network device according to claim 9, wherein the first network device comprises a backbone switching device and a leaf device, the memory comprises a first memory and a second memory, and the processor comprises a first processor and a second processor, wherein the backbone switching device and the leaf device are connected through an intra-system cascade port, the backbone switching device comprises the first memory and the first processor, and the leaf device comprises the second memory and the second processor, wherein
the first processor is configured to execute the program codes stored in the first memory to: receive, through the inter-system cascade port, the first packet sent by the second network device, and add the first RMT identifier to the first packet to obtain the second packet; and
the second processor is configured to execute the program codes stored in the second memory to determine, according to the first and initial RMT identifiers in the second packet and the attribute of the sending port for the second packet, whether to perform pruning processing on the second packet; and
a) when the sending port for the second packet is a multi-homed port, perform pruning processing on the second packet; or
b) when the sending port for the second packet is a single-homed port, delete the first and initial RMT identifiers in the second packet, and send the first packet through the single-homed port.

12. The network device according to claim 9, wherein the first RMT identifier is added to a non-canonical format indicator (CFI) flag bit or a drop eligible indicator (DEI) flag bit of the first packet.

13. The network device according to claim 9, wherein the first RMT identifier is added to a priority code point (PCP) flag bit of the first packet.

14. A network device, wherein the network device is a second network device, and the second network device comprises:
a memory configured to store program codes; and
a processor configured to execute the program codes to:
receive, through an inter-system cascade port, a second packet sent by a first network device, wherein the second packet comprises a first remote (RMT) identifier, the first RMT identifier is used to indicate that the second packet is not a local packet of the second network device, and the second packet further comprises an initial RMT identifier; and
determine, according to the first and initial RMT identifiers in the second packet and an attribute of a sending port for the second packet, whether to perform pruning processing on the second packet, wherein the attribute of the sending port comprises a multi-homed port or a single-homed port; and
a) when the sending port for the second packet is a multi-homed port, perform pruning processing on the second packet; and
b) when the sending port for the second packet is a single-homed port, delete the first and initial RMT identifiers in the second packet to obtain a first packet, and send the first packet through the single-homed port.

15. The network device according to claim 14, wherein when the second network device comprises a backbone switching device, the backbone switching device comprises the processor.

16. The network device according to claim 14, wherein when the second network device comprises a backbone switching device and a leaf device, the memory comprises a first memory and a second memory, and the processor comprises a first processor and a second processor, wherein the backbone switching device and the leaf device are connected through an intra-system cascade port, the backbone switching device comprises the first memory and the first processor, and the leaf device comprises the second memory and the second processor, wherein
the first processor is configured to execute the program codes stored in the first memory to: receive, through the inter-system cascade port, the second packet sent by the first network device; and
the second processor is configured to execute the program codes stored in the second memory to determine, according to the first and initial RMT identifiers in the second packet and the attribute of the sending port for the second packet, whether to perform pruning processing on the second packet; and a) when the sending port for the second packet is a multi-homed port, perform pruning processing on the second packet; or
b) when the sending port for the second packet is a single-homed port, delete the first and initial RMT identifiers in the second packet to obtain the first packet, and send the first packet through the single-homed port.

\* \* \* \* \*